(12) United States Patent
Lin (10) Patent No.: US 11,350,417 B2
(45) Date of Patent: May 31, 2022

(54) METHOD AND APPARATUS FOR TRANSMITTING INFORMATION

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/331,103

(22) PCT Filed: Oct. 17, 2016

(86) PCT No.: PCT/CN2016/102286
§ 371 (c)(1),
(2) Date: Mar. 6, 2019

(87) PCT Pub. No.: WO2018/072062
PCT Pub. Date: Apr. 26, 2018

(65) Prior Publication Data
US 2019/0239229 A1   Aug. 1, 2019

(51) Int. Cl.
*H04W 72/04* (2009.01)
*H04B 7/0413* (2017.01)
(Continued)

(52) U.S. Cl.
CPC ...... *H04W 72/0493* (2013.01); *H04B 7/0413* (2013.01); *H04B 7/0626* (2013.01);
(Continued)

(58) Field of Classification Search
CPC ............. H04W 72/14; H04W 72/0493; H04W 72/0453; H04W 72/0413; H04L 27/2666; H04L 5/0055; H04B 7/0626
See application file for complete search history.

(56) References Cited

U.S. PATENT DOCUMENTS

2012/0127961 A1* 5/2012 Kawamura ........... H04W 24/10
                                                    370/335
2014/0092786 A1* 4/2014 He ........................ H04J 3/1694
                                                    370/280
(Continued)

FOREIGN PATENT DOCUMENTS

CN       101060389 A       10/2007
CN       101997659 A        3/2011
(Continued)

OTHER PUBLICATIONS

International Search Report in international application No. PCT/CN2016/102286, dated Jul. 10, 2017.
(Continued)

*Primary Examiner* — Omer S Mian
(74) *Attorney, Agent, or Firm* — Ladas & Parry, LLP (57) ABSTRACT

The embodiments of the present application provide a method and apparatus for transmitting information, said method comprising: a terminal device determines a first transmission means used in a first time unit for transmitting destination uplink information; said first transmission means is different from a second transmission means used in a second time unit for transmitting said destination uplink information, and the duration of the second time unit used for transmitting the destination uplink information is different from the duration of the first time unit used for transmitting the destination uplink information; the terminal device uses the first transmission means to send the destination uplink information to a network device. The information transmission method and apparatus improve flexibility in allocating time resources in a system and thus improving system performance.

21 Claims, 2 Drawing Sheets

(51) Int. Cl.
    *H04L 5/00* (2006.01)
    *H04B 7/06* (2006.01)
    *H04W 74/00* (2009.01)

(52) U.S. Cl.
    CPC ....... *H04L 5/0055* (2013.01); *H04W 72/0446* (2013.01); *H04W 72/0453* (2013.01); *H04W 74/00* (2013.01)

(56) References Cited

U.S. PATENT DOCUMENTS

| | | | |
|---|---|---|---|
| 2014/0269600 A1 | 9/2014 | Lee et al. | |
| 2016/0095104 A1 | 3/2016 | Chen et al. | |
| 2016/0100395 A1 | 4/2016 | Xu et al. | |
| 2016/0205631 A1 | 7/2016 | Chen et al. | |
| 2016/0255594 A1 | 9/2016 | Vajapeyam et al. | |
| 2016/0352551 A1* | 12/2016 | Zhang | H04L 27/2602 |
| 2017/0041921 A1 | 2/2017 | Oketani | |
| 2017/0171866 A1* | 6/2017 | Cheng | H04W 2/0426 |
| 2017/0290008 A1 | 10/2017 | Tooher et al. | |
| 2018/0242307 A1 | 8/2018 | Chen et al. | |
| 2018/0343649 A1 | 11/2018 | Xu et al. | |
| 2019/0053256 A1* | 2/2019 | Takeda | H04W 28/04 |
| 2020/0128565 A1* | 4/2020 | Golitschek Edler Von Elbwart | H04W 74/0808 |
| 2020/0145988 A1* | 5/2020 | Seo | H04L 1/0026 |

FOREIGN PATENT DOCUMENTS

| | | |
|---|---|---|
| CN | 105025585 A | 11/2015 |
| CN | 105376513 A | 3/2016 |
| CN | 109076502 A | 12/2018 |
| RU | 2551899 C2 | 6/2015 |
| RU | 2599730 C2 | 10/2016 |
| WO | 2011085230 A2 | 7/2011 |
| WO | 2015107600 A1 | 7/2015 |
| WO | 2015167922 A1 | 11/2015 |
| WO | 2016040290 A1 | 3/2016 |
| WO | 2016048595 A1 | 3/2016 |
| WO | 2016048597 A1 | 3/2016 |
| WO | 2016053844 A1 | 4/2016 |
| WO | 2016120461 A1 | 8/2016 |
| WO | 2016123402 A1 | 8/2016 |
| WO | 2016192644 A1 | 12/2016 |

OTHER PUBLICATIONS

Written Opinion of the International Search Authority in international application No. PCT/CN2016/102286, dated Jul. 10, 2017.
Supplementary European Search Report in the European application No. 16919221.8, dated Jun. 25, 2019.
English translation of the Written Opinion of the International Search Authority in the international application No. PCT/CN2016/102286, dated Jul. 10, 2017.
First Office Action of the Russian application No. 2019112311, dated Mar. 5, 2020.
First Office Action of the Chinese application No. 201680088941.2, dated Mar. 9, 2020.
First Office Action of the Singaporean application No. 11201902173Y, dated May 2, 2020.
CATT. "NR UL Control Channel Design Considerations", 3GPP TSG RAN WG1 Meeting #86bis R1-1608792, published on Oct. 3, 2016.
Second Office Action of the Chinese application No. 201680088941.2, dated Jun. 10, 2020.
First Office Action of the European application No. 16919221.8, dated Jul. 7, 2020.
Notice of Rejection of the Chinese application No. 201680088941.2, dated Aug. 24, 2020.
First Office Action of the Japanese application No. 2019-513429, dated Oct. 16, 2020.
Second Office Action of the Canadian application No. 3036519, dated Nov. 6, 2020.
First Office Action of the Brazilian application No. BR1120190076255, dated Sep. 8, 2020.
Second Office Action of the Chilean application No. 201901028, dated Nov. 4, 2020.
Office Action of the Indian application No. 201917014307, dated Dec. 1, 2020.
First Office Action of the Israeli application No. 265460, dated Nov. 11, 2020.
First Office Action of the Chilean application No. 201901028, dated Feb. 19, 2020.
First Office Action of the Canadian application No. 3036519, dated Jan. 9, 2020.
First Office Action of the Indonesia application No. P00201903709, dated Apr. 13, 2021.
Second Office Action of the Japanese application No. 2019-513429, dated Jun. 29, 2021.
First Office Action of the Taiwan application No. 106130401, dated May 7, 2021.
Office Action of the Australian application No. 2016427037, dated Aug. 10, 2021.
Third Office Action of the Canadian application No. 3036519, dated Aug. 25, 2021.
ZTE: "Remaining Open issues of Simultaneous transmission of UL Channels/Signals", 3GPP Draft; R1-110165 Remaining Open Issues Of Simultaneous Transmission Of UL Channels, 3rd Generation Partnership Project (3GPP), Mobile Competence Centre: 650, Route Des Lucioles: F-06921 Sophia-Antipolis Cedex; France, vol. RAN WG1, No. Dublin, Ireland; Jan. 17, 2011-Jan. 21, 2011, Jan. 31, 2011 (Jan. 31, 2011), XP050599022, entire document.
Second Office Action of the European application No. 16919221.8, dated Oct. 14, 2021.

* cited by examiner

100

A terminal device determines a first transmission manner adopted for transmission of target uplink information in a first time unit, the first transmission manner being different from a second transmission manner adopted by the terminal device for transmission of the target uplink information in a second time unit and a time length for transmission of the target uplink information in the second time unit being different from a time length for transmission of the target uplink information in the first time unit — S110

The terminal device sends the target uplink information to a network device in the first transmission manner — S120

Start

A network device receives target uplink information sent by a terminal device through a first transmission manner in a first transmission unit, the first transmission manner being different from a second transmission manner adopted by the terminal device for transmission of the target uplink information in a second time unit and a time length for transmission of the target uplink information in the second time unit being different from a time length for transmission of the target uplink information in the first time unit — S210

End

FIG. 2

Device 300

Determination unit 310

Sending unit 310

METHOD AND APPARATUS FOR TRANSMITTING INFORMATION

CROSS-REFERENCE TO RELATED APPLICATION

The present application is the U.S. national phase application of PCT Application No. PCT/CN2016/102286 filed on Oct. 17, 2016, the disclosure of which is incorporated herein in its entirety by reference.

TECHNICAL FIELD

The disclosure relates to the field of communications, and more particularly to a method and device for transmitting information in the field of communications.

BACKGROUND

An existing New Radio (NR) system supports a dynamic frame structure configuration, that is, uplink and downlink transmission time resources in a frequency band are dynamically determined according to a service requirement. Therefore, three types of time units may exist in a frequency band: uplink time units, downlink time units and hybrid time units. The uplink time units are configured for transmitting uplink information, the downlink time units are configured for transmitting downlink information and the hybrid time units are configured for transmitting the uplink information and the downlink information.

Uplink information mainly includes uplink control information, uplink data information and an uplink reference signal. The type of the uplink control information includes Acknowledgement/Non-Acknowledgement (ACK/NACK) information, periodic Channel State Information (CSI) and aperiodic CSI. Transmission time of the periodic CSI is semi-statically configured by a base station. The ACK/NACK information is sent to a network device by a terminal device after the terminal device receives downlink data sent by the network device, such that the ACK/NACK information may be transmitted in the same time unit together with the downlink data and may also be transmitted in another time unit after a time unit where the downlink data is transmitted.

In a related art, a terminal device always adopts time units of an undiversified type to transmit uplink information. For example, for periodic CSI, an uplink time unit is adopted every time when the periodic CSI is sent or a hybrid time unit is adopted every time when the periodic CSI is sent. In this way, it may inevitably bring influence to the flexibility of time resource allocation in a system.

SUMMARY

Embodiments of the disclosure provide a method and device for transmitting information, which may improve the flexibility of time resource allocation in a system.

According to a first aspect, the disclosure provides a method for transmitting information, which may include the following operations. A terminal device determines a first transmission manner adopted for transmission of target uplink information in a first time unit, the first transmission manner being different from a second transmission manner adopted by the terminal device for transmission of the target uplink information in a second time unit and a time length for transmission of the target uplink information in the second time unit being different from a time length for transmission of the target uplink information in the first time unit. The terminal device sends the target uplink information to a network device in the first transmission manner.

According to the method for transmitting information of the embodiments of the disclosure, the terminal device determines the first transmission manner adopted for transmission of the target uplink information in the first time unit and adopts the first transmission manner to send the target uplink information to the network device. The first transmission manner is different from the second transmission manner adopted by the terminal device for transmission of the target uplink information in the second time unit different from the first time unit. In such a manner, the terminal device may send the target uplink information in different transmission manners through different time units and the flexibility of time resource allocation in a system may be improved, thereby improving system performance.

It is to be understood that a first transmission unit may be a hybrid time unit and a second transmission unit may be a conventional uplink time unit. However, there are no limits made thereto in the embodiments of the disclosure.

In at least one embodiment, the time unit can be understood as a Transport Block (TB). For example, the time unit may be a basic unit of a time-domain physical resource configured for signal transmission and may specifically be a subframe, a Transmission Time Interval (TTI), a time slot, an Orthogonal Frequency Division Multiplexing (OFDM) symbol, a Resource Element (RE) or the like. There are no limits made thereto in the embodiments of the disclosure.

In a first possible implementation mode of the first aspect, before the operation that the terminal device determines the first transmission manner adopted for transmission of the target uplink information in the first time unit, the method may further include the following operation. The terminal device receives a first notification message sent by the network device, the first notification message being configured to notify the terminal device that the target uplink information can be transmitted in the first time unit and the second time unit.

In combination with the abovementioned possible implementation mode of the first aspect, in a second possible implementation mode of the first aspect, the type of the target uplink information may include at least one of ACK/NACK information or periodic CSI.

In combination with the abovementioned possible implementation modes of the first aspect, in a third possible implementation mode of the first aspect, each of the first transmission manner and the second transmission manner may include at least one of the following manners, and at least one of the following manners for the first transmission manner may be different from that for the second transmission manner: a preprocessing manner adopted by the terminal device for the target uplink information; a transmission mode adopted by the terminal device for transmission of the target uplink information, the transmission mode being a Multiple Input Multiple Output (MIMO) mode; a number of frequency-domain resources adopted by the terminal device for transmission of the target uplink information; transmit power adopted by the terminal device for transmission of the target uplink information; or a resource index of a resource adopted by the terminal device for transmission of the target uplink information.

It is to be understood that the preprocessing manner may be compression processing and may also be bundling. There are no limits made thereto in the embodiments of the disclosure. The transmission mode may be a transmit diversity mode and may also be other transmission modes, such as space multiplexing, beamforming and the like. There are no limits made thereto in the embodiments of the disclosure.

In combination with the abovementioned possible implementation modes of the first aspect, in a fourth possible implementation mode of the first aspect, the operation that the terminal device determines the first transmission manner adopted for transmission of the target uplink information in the first time unit may include that the following action. The terminal device determines a first transmission mode adopted for transmission of the target uplink information in the first time unit. The first transmission mode is a predetermined transmission mode.

In combination with the abovementioned possible implementation modes of the first aspect, in a fifth possible implementation mode of the first aspect, before the operation that the terminal device determines the first transmission manner adopted for transmission of the target uplink information in the first time unit, the method may further include the following operation. The terminal device receives the first transmission mode adopted for transmission of the target uplink information in the first time unit from the network device.

As mentioned above, the first transmission mode may be a transmission mode directly determined by the terminal device according to a predetermination and may also be a transmission mode directly configured for the terminal device by the network device. It is to be understood that the first transmission mode adopted by the terminal device in the first time unit and a second transmission mode adopted in the second time unit may be the same and may also be different. There are no limits made thereto in the embodiments of the disclosure.

In combination with the abovementioned possible implementation modes of the first aspect, in a sixth possible implementation mode of the first aspect, the operation that the terminal device determines the first transmission manner adopted for transmission of the target uplink information in the first time unit may include the following action. The terminal device determines a number of first frequency-domain resources adopted for transmission of the target uplink information in the first time unit according to at least one of the following information: a number of second frequency-domain resources, a number of uplink time resources in the first time unit or a number of uplink time resources in the second time unit, the number of second frequency-domain resources being the number of frequency-domain resources adopted by the terminal device for transmission of the target uplink information in the second time unit; or the terminal device determines the number of the first frequency-domain resources according to a predetermined parameter or a predetermined rule.

Specifically, the terminal device may determine the number of the first frequency-domain resources in multiple manners. Since the terminal device has learned about a size of the target uplink information, the terminal device may directly determine the number of the first frequency-domain resources according to the number of the uplink time resources in the first time unit. The terminal device may directly determine the number of the first frequency-domain resources according to the number of the second frequency-domain resources adopted for transmission of the target uplink information in the second time unit. The terminal device may determine the number of the first frequency-domain resources according to the number of the second frequency-domain resources and the number of the uplink time resources in the first time unit. The terminal device may also determine the number of the first frequency-domain resources in combination with the number of the second frequency-domain resources, the number of the uplink time resources in the first time unit and the number of the uplink time resources in the second time unit. In addition, the terminal device may also determine the number of the first frequency-domain resources according to the predetermined parameter or the predetermined rule. There are no limits made thereto in the embodiments of the disclosure.

In combination with the abovementioned possible implementation modes of the first aspect, in a seventh possible implementation mode of the first aspect, before the operation that the terminal device determines the first transmission manner adopted for transmission of the target uplink information in the first time unit, the method may further include the following operation. The terminal device receives the number of the first frequency-domain resources adopted for transmission of the target uplink information in the first time unit from the network device.

As mentioned above, the number of the first frequency-domain resources may be directly determined by the terminal device according to a predetermination and may also be directly configured for the terminal device by the network device. There are no limits made thereto in the embodiments of the disclosure.

In combination with the abovementioned possible implementation modes of the first aspect, in an eighth possible implementation mode of the first aspect, the number of the first frequency-domain resources may be $\lceil A \cdot B \rceil$, where A and B may be positive numbers, A may be the number of the second frequency-domain resources or a predetermined parameter and B may be a predetermined parameter, a parameter determined according to the predetermined rule or a parameter received by the terminal device from the network device.

It is to be understood that the number of the first frequency-domain resources determined according to A and B may be obtained by various different combinations. There are no limits made thereto in the embodiments of the disclosure.

In combination with the abovementioned possible implementation modes of the first aspect, in a ninth possible implementation mode of the first aspect, $B=k \cdot \lceil M/x \rceil$, where M may be the number of the uplink time resources in the second time unit, k may be a positive integer and k may be a predetermined parameter or a parameter received by the terminal device from the network device. In an alternative embodiment, $B=\lceil t \cdot M/x \rceil$, where M may be the number of the uplink time resources in the second time unit, t may be a positive number and t may be a predetermined parameter or a parameter received by the terminal device from the network device. In an alternative embodiment, $B=q \cdot x$, where q may be a positive number and q may be a predetermined parameter or a parameter received by the terminal device from the network device.

In combination with the abovementioned possible implementation modes, in a tenth possible implementation mode of the first aspect, before the operation that the terminal device determines the first transmission manner adopted for transmission of the target uplink information in the first time unit, the method may further include the following operation. The terminal device receives a first transmit power control command sent by the network device. The first transmit power control command is configured to adjust transmit power for transmission of the target uplink information in the first time unit or the first transmit power control command is configured to adjust the transmit power for transmission of the target uplink information in the first time unit and transmit power for transmission of the target uplink information in the second time unit. The operation that the terminal device determines the first transmission manner adopted for transmission of the target uplink information in the first time unit may include the following action. The terminal device determines a first transmit power adopted for transmission of the target uplink information in the first time unit according to the first transmit power control command.

It is to be understood that for the first time unit and the second time unit, independent power control manners may be adopted and a unified power control manner may also be adopted. That is, first power regulation information may only be configured to adjust the transmit power for transmission of the target uplink information in the first time unit, and may also be configured to adjust the transmit power for transmission of the target uplink information in the first time unit and the transmit power for transmission of the target uplink information in the second time unit. There are no limits made thereto in the embodiments of the disclosure.

In combination with the abovementioned possible implementation modes of the first aspect, in an eleventh possible implementation mode of the first aspect, the operation that the terminal device determines the first transmission manner adopted for transmission of the target uplink information in the first time unit may include the following action. The terminal device determines a first resource index adopted for transmission of the target uplink information in the first time unit according to first information. The first information is different from second information and the second information is configured for the terminal device to determine a second resource index adopted for transmission of the target uplink information in the second time unit.

Specifically, the first information may directly be a specific resource index and may also be another parameter related to the resource index, for example, a physical resource index occupied by downlink control signaling, or a physical resource index occupied by a downlink data channel or other high-layer signaling. There are no limits made thereto in the embodiments of the disclosure.

In combination with the abovementioned possible implementation modes of the first aspect, in a twelfth possible implementation mode of the first aspect, the operation that the terminal device determines the first transmission manner adopted for transmission of the target uplink information in the first time unit may include the following action. The terminal device determines the first resource index adopted for transmission of the target uplink information in the first time unit according to third information and a first algorithm. The first algorithm is different from a second algorithm and the second algorithm is configured for the terminal device to determine the second resource index adopted for transmission of the target uplink information in the second time unit according to the third information.

Specifically, the third information may be configuration signaling transmitted to the terminal device by the network device, for example, downlink control signaling and high-layer signaling. There are no limits made thereto in the embodiments of the disclosure. The first algorithm may be a predetermined algorithm and may also be an algorithm configured for the terminal device by the network device. There are also no limits made thereto in the embodiments of the disclosure.

In combination with the abovementioned possible implementation modes of the first aspect, in a thirteenth possible implementation mode of the first aspect, responsive to determining that the type of the target uplink information is the periodic CSI, the first preprocessing manner may be to select information with a highest priority in the periodic CSI for transmission; or responsive to determining that the type of the target uplink information is the ACK/NACK information, the first preprocessing manner may be to perform bundling across the ACK/NACK information.

According to a second aspect, the disclosure provides a method for transmitting information, which may include the following operation. A network device receives target uplink information sent by a terminal device through a first transmission manner in a first transmission unit. The first transmission manner is different from a second transmission manner adopted by the terminal device for transmission of the target uplink information in a second time unit and a time length for transmission of the target uplink information in the second time unit is different from a time length for transmission of the target uplink information in the first time unit.

According to the method for transmitting information of the embodiments of the disclosure, the network device receives the target uplink information sent by the terminal device in the first transmission manner, the first transmission manner is different from the second transmission manner that is adopted by the terminal device for transmission of the target uplink information in the second time unit different from the first time unit. In such a manner, the network device may receive the target uplink information sent by the terminal device in different transmission manners through different time units and the flexibility of time resource allocation in a system may be improved, thereby improving system performance.

In combination with a first possible implementation mode of the second aspect, the type of the target uplink information may include at least one of ACK/NACK information or periodic CSI.

In combination with the abovementioned possible implementation mode of the second aspect, in a second possible implementation mode of the second aspect, each of the first transmission manner and the second transmission manner may include at least one of the following manners, and at least one of the following manners for the first transmission manner may be different from that for the second transmission manner: a preprocessing manner adopted by the terminal device for the target uplink information; a transmission mode adopted by the terminal device for transmission of the target uplink information, the transmission mode being an MIMO mode; a number of frequency-domain resources adopted by the terminal device for transmission of the target uplink information; transmit power adopted by the terminal device for transmission of the target uplink information; or a resource index of a resource adopted by the terminal device for transmission of the target uplink information.

In combination with the abovementioned possible implementation modes of the second aspect, in a third possible implementation mode of the second aspect, before the operation that the network device receives the target uplink information sent by the terminal device through the first transmission manner in the first transmission unit, the method may further include the following operation. The network device sends a first transmission mode adopted for transmission of the target uplink information in the first time unit to the terminal device.

In combination with the abovementioned possible implementation modes of the second aspect, in a fourth possible implementation mode of the second aspect, before the operation that the network device receives the target uplink information sent by the terminal device through the first transmission manner in the first transmission unit, the method may further include the following operation. The network device sends the number of first frequency-domain resources adopted for transmission of the target uplink information in the first time unit to the terminal device.

In combination with the abovementioned possible implementation modes of the second aspect, in a fifth possible implementation mode of the second aspect, the number of the first frequency-domain resources may be $\lceil A \cdot B \rceil$, where A and B may, be positive numbers, A may be the number of the second frequency-domain resources or a predetermined parameter and B may be a predetermined parameter, a parameter determined according to a predetermined rule or a parameter received by the terminal device from the network device.

In combination with the abovementioned possible implementation modes of the second aspect, in a sixth possible implementation mode of the second aspect, $B=k \cdot \lceil M/x \rceil$, where M may be the number of uplink time resources in the second time unit, k may be a positive integer and k may be a predetermined parameter or a parameter received by the terminal device from the network device. In an alternative embodiment, $B=\lceil t \cdot M/x \rceil$, where M may be the number of the uplink time resources in the second time unit, t may be a positive number and t may be a predetermined parameter or a parameter received by the terminal device from the network device. In an alternative embodiment, $B=q \cdot x$, where q may be a positive number and q may be a predetermined parameter or a parameter received by the terminal device from the network device.

In combination with the abovementioned possible implementation modes of the second aspect, in a seventh possible implementation mode of the second aspect, before the operation that the network device receives the target uplink information sent by the terminal device through the first transmission manner in the first transmission unit, the method may further include the following operation. The network device sends a first transmit power control command to the terminal device. The first transmit power control command is configured to adjust transmit power for transmission of the target uplink information in the first time unit, or the first transmit power control command is configured to adjust the transmit power for transmission of the target uplink information in the first time unit and transmit power for transmission of the target uplink information in the second time unit.

In combination with the abovementioned possible implementation modes of the second aspect, in an eighth possible implementation mode of the second aspect, before the operation that the network device receives the target uplink information sent by the terminal device through the first transmission manner in the first transmission unit, the method may further include the following operation. The network device sends first information to the terminal device, the first information is configured for the terminal device to determine a first resource index adopted for transmission of the target uplink information in the first time unit, the first information is different from second information and the second information is configured for the terminal device to determine a second resource index adopted for transmission of the target uplink information in the second time unit.

In combination with the abovementioned possible implementation modes of the second aspect, in a ninth possible implementation mode of the second aspect, the network device may send third information and a first algorithm to the terminal device. The third information and the first algorithm is configured for the terminal device to determine the first resource index adopted for transmission of the target uplink information in the first time unit, the first algorithm is different from a second algorithm and the second algorithm is configured for the terminal device to determine the second resource index adopted for transmission of the target uplink information in the second time unit according to the third information.

In combination with the abovementioned possible implementation modes of the second aspect, in a tenth possible implementation mode of the second aspect, responsive to determining that the type of the target uplink information is the periodic CSI, the first preprocessing manner may be to select information with a highest priority in the periodic CSI for transmission; or responsive to determining that the type of the target uplink information is the ACK/NACK information, the first preprocessing manner may be to perform bundling across the ACK/NACK information.

In combination with the abovementioned possible implementation modes of the second aspect, in an eleventh possible implementation mode of the second aspect, before the operation that the network device receives the target uplink information sent by the terminal device through the first transmission manner in the first transmission unit, the method may further include the following operation. The network device sends a first notification message to the terminal device. The first notification message is configured to notify the terminal device that the target uplink information can be transmitted in the first time unit and the second time unit.

According to a third aspect, the disclosure provides a device for transmitting information, which is configured to execute the method in the first aspect or any possible implementation mode of the first aspect. Specifically, the device includes units configured to execute the method in the first aspect or any possible implementation mode of the first aspect.

According to a fourth aspect, the disclosure provides a device for transmitting information, which is configured to execute the method in the second aspect or any possible implementation mode of the second aspect. Specifically, the device includes units configured to execute the method in the second aspect or any possible implementation mode of the second aspect.

According to a fifth aspect, the disclosure provides a device for transmitting information, which includes a receiver, a sender, a memory, a processor and a bus system. The receiver, the sender, the memory and the processor are connected through the bus system. The memory is configured to store an instruction. The processor is configured to execute the instruction stored in the memory to control the receiver to receive signals and control the sender to send signals. When the processor executes the instruction stored in the memory, such execution enables the processor to execute the method in the first aspect or any possible implementation mode of the first aspect.

According to a sixth aspect, the disclosure provides an information transmission device, which includes a receiver, a sender, a memory, a processor and a bus system. The receiver, the sender, the memory and the processor are connected through the bus system. The memory is configured to store an instruction. The processor is configured to execute the instruction stored in the memory to control the receiver to receive signals and control the sender to send signals. When the processor executes the instruction stored in the memory, such execution enables the processor to execute the method in the second aspect or any possible implementation mode of the second aspect.

According to a seventh aspect, the disclosure provides a system for transmitting information, which includes the device in the third aspect or any possible implementation mode of the third aspect and the device in the fourth aspect or any possible implementation mode of the fourth aspect; or the system includes the device in the fifth aspect or any possible implementation mode of the fifth aspect and the device in the sixth aspect or any possible implementation mode of the sixth aspect.

According to an eighth aspect, the disclosure provides a computer-readable medium, which is configured to store a computer program. The computer program includes an instruction configured to execute the method in the first aspect or any possible implementation mode of the first aspect.

According to a ninth aspect, the disclosure provides a computer-readable medium, which is configured to store a computer program. The computer program includes an instruction configured to execute the method in the second aspect or any possible implementation mode of the second aspect.

BRIEF DESCRIPTION OF DRAWINGS

In order to describe the technical solutions of the embodiments of the disclosure more clearly, the drawings required to be used in descriptions about the embodiments or a conventional art will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a communication system which may emerge in the future.

It is also to be understood that, in the embodiments of the disclosure, a terminal device may be called User Equipment (UE), a terminal device, a Mobile Station (MS), a mobile terminal, a terminal device in a future 5th-Generation (5G) network or the like. The terminal device may communicate with one or more core networks through a Radio Access Memory (RAN). For example, a terminal may be a mobile phone (or called a "cellular" phone) and a computer with a mobile terminal. For example, the terminal may also be a portable, pocket, handheld, computer-embedded or vehicle-mounted mobile device and performs voice and/or data exchange with the RAN.

A network device may be configured to communicate with a mobile device. The network device may be a Base Transceiver Station (BTS) in the GSM or CDMA, may also be a NodeB (NB) in WCDMA and may further be an Evolutional Node B (eNB or eNodeB) in LTE, or a relay station or access point, or a vehicle-mounted device, a wearable device and an access network device in the future 5G network.

Figure 1:
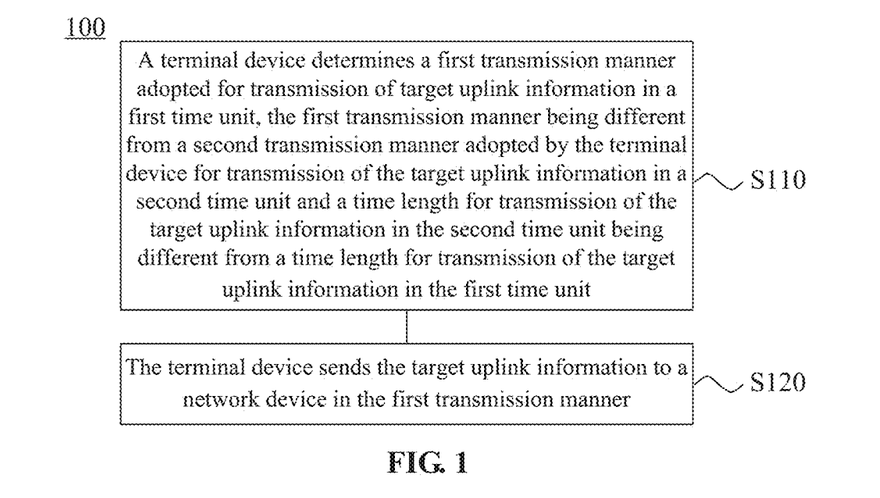
FIG. 1 is a schematic flowchart of a method for transmitting information according to an embodiment of the disclosure.

FIG. 1 is a schematic flowchart of a method 100 for transmitting information according to an embodiment of the disclosure. FIG. 1 illustrates actions or operations of the method for transmitting information. However, these actions or operations are only examples. Other operations or transformations of each operation in FIG. 1 may also be executed in the embodiment of the disclosure. The method 100 includes the following operations.

In S110, a terminal device determines a first transmission manner adopted for transmission of target uplink information in a first time unit, the first transmission manner being different from a second transmission manner adopted by the terminal device for transmission of the target uplink information in a second time unit and a time length for transmission of the target uplink information in the second time unit being different from a time length for transmission of the target uplink information in the first time unit.

In S120, the terminal device sends the target uplink information to a network device in the first transmission manner.

According to the method for transmitting information of the embodiment of the disclosure, the terminal device determines the first transmission manner adopted for transmission of the target uplink information in the first time unit and adopts the first transmission manner to send the target uplink information to the network device. The first transmission manner is different from the second transmission manner adopted by the terminal device for transmission of the target uplink information in the second time unit different from the first time unit. In such a manner, the terminal device may adopt different transmission manners to send the target uplink information through different time units and the flexibility of time resource allocation in a system may be improved, thereby improving system performance.

Figure 2:
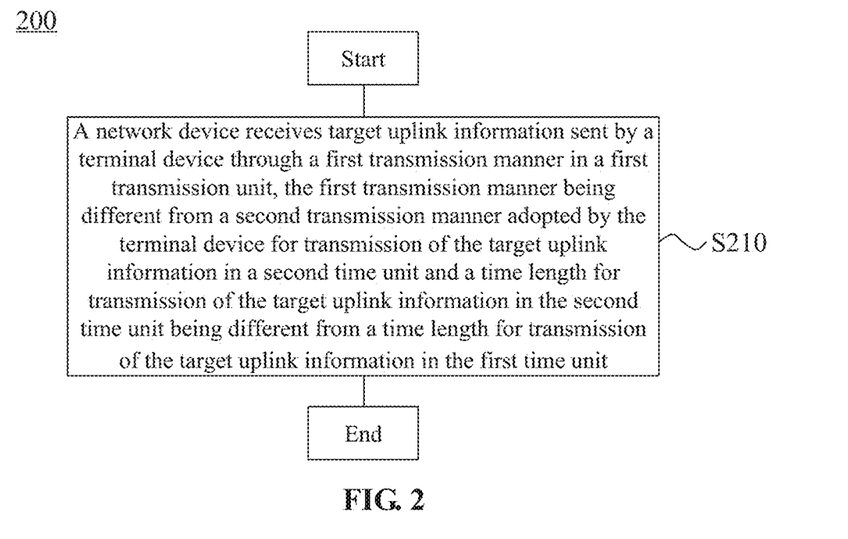
FIG. 2 is a schematic flowchart of another method for transmitting information according to an embodiment of the disclosure.

FIG. 2 is a schematic flowchart of another method 200 for transmitting information according to an embodiment of the disclosure. FIG. 2 illustrates actions or operations of the information transmission method. However, these actions or operations are only examples. Other operations or transformations of each operation in FIG. 2 may also be executed in the embodiment of the disclosure. The method 200 includes the following operation.

In S210, a network device receives target uplink information sent by a terminal device through a first transmission manner in a first transmission unit, the first transmission manner being different from a second transmission manner adopted by the terminal device for transmission of the target uplink information in a second time unit and a time length for transmission of the target uplink information in the second time unit being different from a time length for transmission of the target uplink information in the first time unit.

According to the method for transmitting information of the embodiment of the disclosure, the network device receives the target uplink information sent by the terminal device in the first transmission manner. The first transmission manner is different from the second transmission manner adopted by the terminal device for transmission of the target uplink information in the second time unit different from the first time unit. In such a manner, the network device may receive the target uplink information sent by the terminal device in different transmission manners through different time units and the flexibility of time resource allocation in a system may be improved, thereby improving system performance.

It is to be understood that in the embodiments of the disclosure, numbers "first" and "second" are introduced only to distinguish different objects, for example, to distinguish different "time units" or distinguish different "transmission manners". Numbers appearing hereinafter are also adopted to distinguish different objects. All of these are not intended to limit the embodiments of the disclosure.

In the embodiments of the disclosure, the first transmission unit may be a hybrid time unit and a second transmission unit may be a conventional uplink time unit. However, there are no limits made thereto in the embodiments of the disclosure.

It is also to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure.

In at least one embodiment, the time unit can be understood as a Transport Block (TB). For example, the time unit may be a basic unit of a time-domain physical resource configured for signal transmission and may specifically be a subframe, a TTI, a time slot, an OFDM symbol, an RE or the like. There are no limits made thereto in the embodiments of the disclosure.

As an alternative embodiment, before the operation in S110 that the terminal device determines the first transmission manner adopted for transmission of the target uplink information in the first time unit, the method further includes the following operation.

The terminal device receives first indication information sent by the network device. The first indication information is configured to instruct the terminal device to transmit the target uplink information in the first transmission manner in the first time unit.

The operation in S110 that the terminal device determines to transmit the target uplink information in the first transmission manner in the first time unit includes the following action.

The terminal device determines the first transmission manner according to the first indication information.

Correspondingly, before the operation in S210 that the network device receives the target uplink information sent by the terminal device through the first transmission manner in the first transmission unit, the network device sends the first indication information to the terminal device, the first indication information being configured to instruct the terminal device to transmit the target uplink information in the first transmission manner in the first time unit.

As an alternative embodiment, the operation in SI 10 that the terminal device determines the first transmission manner adopted for transmission of the target uplink information in the first time unit includes the following action.

The terminal device determines the first transmission manner according to a predetermined rule.

Specifically, the terminal device may determine the first transmission manner adopted for transmission of the target uplink information in the first time unit through various manners. As mentioned above, the first transmission manner may be indicated by the network device, namely determined through receiving the first indication information sent by the network device, and may also be determined by the terminal device according to the predetermined rule. There are no limits made thereto in the embodiments of the disclosure.

As an alternative embodiment, before the operation in S110 that the terminal device determines the first transmission manner adopted for transmission of the target uplink information in the first time unit, the method further includes that: the terminal device receives a first notification message sent by the network device. The first notification message is configured to notify the terminal device that the target uplink information can be transmitted in the first time unit and the second time unit.

Correspondingly, before the operation that the network device receives the target uplink information sent by the terminal device through the first transmission manner in the first transmission unit, the method further includes the following operation. The network device sends the first notification message to the terminal device.

As an alternative embodiment, the type of the target uplink information includes at least one of ACK/NACK information or periodic CSI.

As an alternative embodiment, at least one of the following manners the first transmission manner includes is different from at least one of the following manners the second transmission manner includes: a preprocessing manner adopted by the terminal device for the target uplink information; a transmission mode adopted by the terminal device for transmission of the target uplink information, the transmission mode being an MIMO mode; the number of frequency-domain resources adopted by the terminal device for transmission of the target uplink information; transmit power adopted by the terminal device for transmission of the target uplink information; or a resource index of a resource adopted by the terminal device for transmission of the target uplink information.

It is to be understood that the preprocessing manner may be compression processing and may also be bundling processing. There are no limits made thereto in the embodiments of the disclosure. The transmission mode may be a transmit diversity mode and may also be other transmission modes, such as, space multiplexing, beamforming or the like. There are no limits made thereto in the embodiments of the disclosure.

When the first transmission manner at least includes a first transmission mode adopted for transmission of the target uplink information in the first time unit, the operation that the terminal device determines the first transmission manner includes that the terminal device determines the first transmission mode. Specifically, the terminal device may determine the first transmission mode in multiple manners. There are no limits made thereto in the embodiments of the disclosure.

As an alternative embodiment, the operation in S110 that the terminal device determines the first transmission manner adopted for transmission of the target uplink information in the first time unit includes the following action.

The terminal device determines a first transmission mode adopted for transmission of the target uplink information in the first time unit. The first transmission mode is a predetermined transmission mode.

As an alternative embodiment, before the operation in S110 that the terminal device determines the first transmission manner adopted for transmission of the target uplink information in the first time unit, the method further includes the following operation.

The terminal device receives the first transmission mode adopted for transmission of the target uplink information in the first time unit from the network device.

Correspondingly, before the operation that the network device receives the target uplink information sent by the terminal device through the first transmission manner in the first transmission unit, the method further includes the following operation.

The network device sends the first transmission mode adopted for transmission of the target uplink information in the first time unit to the terminal device.

As mentioned above, the first transmission mode may be a transmission mode directly determined by the terminal device according to a predetermination and may also be a transmission mode directly configured for the terminal device by the network device. It is to be understood that the first transmission mode adopted by the terminal device in the first time unit and a second transmission mode adopted in the second time unit may be the same and may also be different. There are no limits made thereto in the embodiments of the disclosure.

When the first transmission manner at least includes the number of the first frequency-domain resources adopted for transmission of the target uplink information in the first time unit, the operation that the terminal device determines the first transmission manner includes that the terminal device determines the number of the first frequency-domain resources. It is to be understood that the terminal device may determine the number of the first frequency-domain resources in multiple manners. There are no limits made thereto in the embodiments of the disclosure.

As an alternative embodiment, the operation that the terminal device determines the first transmission manner adopted for transmission of the target uplink information in the first time unit includes one of the following actions.

The terminal device determines the number of the first frequency-domain resources adopted for transmission of the target uplink information in the first time unit according to at least one of the following information: the number of the second frequency-domain resources, the number of uplink time resources in the first time unit and the number of uplink time resources in the second time unit. The number of the second frequency-domain resources is a number of the frequency-domain resources adopted by the terminal device for transmission of the target uplink information in the second time unit.

The terminal device determines the number of the first frequency-domain resources according to a predetermined parameter or a predetermined rule.

Specifically, the terminal device may determine the number of the first frequency-domain resources in multiple manners. Since the terminal device has learned about a size of the target uplink information, the terminal device may directly determine the number of the first frequency-domain resources according to the number of the uplink time resources in the first time unit. The terminal device may directly determine the number of the first frequency-domain resources according to the number of the second frequency-domain resources adopted for transmission of the target uplink information in the second time unit. The terminal device may determine the number of the first frequency-domain resources according to the number of the second frequency-domain resources and the number of the uplink time resources in the first time unit. The terminal device may also determine the number of the first frequency-domain resources in combination with the number of the second frequency-domain resources, the number of the uplink time resources in the first time unit and the number of the uplink time resources in the second time unit. In addition, the terminal device may also determine the number of the first frequency-domain resources according to the predetermined parameter or the predetermined rule. There are no limits made thereto in the embodiments of the disclosure.

As an alternative embodiment, the operation that the terminal device determines the number of the first frequency-domain resources includes the following action.

The terminal device receives the number of the first frequency-domain resources adopted for transmission of the target uplink information in the first time unit from the network device.

Correspondingly, before the operation that the network device receives the target uplink information sent by the terminal device through the first transmission manner in the first transmission unit, the method further includes the following operation.

The network device sends the number of the first frequency-domain resources to the terminal device.

As mentioned above, the number of the first frequency-domain resources may be directly determined by the terminal device according to a predetermination and may also be directly configured for the terminal device by the network device. There are no limits made thereto in the embodiments of the disclosure.

It is to be understood that the number of the second frequency-domain resources is the number of frequency-domain resources adopted by the terminal device for transmission of the target uplink information in the second time unit. Since the time length for transmission of the target uplink information in the second time unit is larger than the time length for transmission of the target uplink information in the first time unit, the number of the frequency-domain resources for transmission of the target uplink information in the first time unit is more than or equal to the number of the frequency-domain resources adopted for transmission of the target uplink information in the second time unit. That is, the number of the first frequency-domain resources is more than or equal to the number of the second frequency-domain resources.

As an alternative embodiment, the number of the first frequency-domain resources is $\lceil A \cdot B \rceil$. A and B are positive numbers, A is the number of the second frequency-domain resources or a predetermined parameter and B is a predetermined parameter, a parameter determined according to the predetermined rule or a parameter received by the terminal device from the network device.

Specifically, the number of the first frequency-domain resources may be $\lceil A \cdot B \rceil$, where A and/or B may be predetermined parameters and may also be parameters directly configured by the network device. There are multiple possible implementation modes, which may specifically be divided into the following conditions. (1) A is the number of the second frequency-domain resources, B is a predetermined parameter or a parameter sent to the terminal device by the network device and, and in this case, the number of the first frequency-domain resources is related to the number of the second frequency-domain resources. (2) A is the number of the second frequency-domain resources and B is a parameter determined according to the predetermined rule, for example, B=f(x), x being the number of the uplink time resources in the first transmission unit, and in this case, the number of the first frequency-domain resources is related to both of the number of the second frequency-domain resources and the number of the uplink time resources in the first transmission unit. (3) A is a predetermined parameter and B is a predetermined parameter, that is, the number of the first frequency-domain resources is predetermined. (4) A is a predetermined parameter, B is a parameter sent to the terminal device by the network device, and in such case, it can be understood that the number of the first frequency-domain resources is configured by the network device. (5) A is a predetermined parameter, B is a parameter determined according to the predetermined rule, for example, B=f(x), x being the number of the uplink time resources in the first transmission unit, and in such case, the number of the first frequency-domain resources is only related to the number of the uplink time resources in the first transmission unit. It is to be understood that the number of the first frequency-domain resources may be determined by using other possible combination manner. There are no limits made thereto in the embodiments of the disclosure.

As an alternative embodiment, $B = k \cdot \lceil M/x \rceil$. M is the number of the uplink time resources in the second time unit, k is a positive integer and k is a predetermined parameter or a parameter received by the terminal device from the network device.

As an alternative embodiment, $B = \lceil t \cdot M/x \rceil$. M is the number of the uplink time resources in the second time unit, t is a positive number and t is a predetermined parameter or a parameter received by the terminal device from the network device.

As an alternative embodiment, $B = q \cdot x$. q is a positive number and q is a predetermined parameter or a parameter received by the terminal device from the network device.

As an alternative embodiment, before the operation in S110 that the terminal device determines the first transmission manner adopted for transmission of the target uplink information in the first time unit, the method further includes the following operation.

The terminal device receives a first transmit power control command sent by the network device. The first transmit power control command is configured to adjust transmit power for transmission of the target uplink information in the first time unit or the first transmit power control command is configured to adjust the transmit power for transmission of the target uplink information in the first time unit and transmit power for transmission of the target uplink information in the second time unit.

The operation in S110 that the terminal device determines the first transmission manner adopted for transmission of the target uplink information in the first time unit includes the following action.

The terminal device determines a first transmit power adopted for transmission of the target uplink information in the first time unit according to the first transmit power control command.

Correspondingly, before the operation that the network device receives the target uplink information sent by the terminal device through the first transmission manner in the first transmission unit, the method further includes the following operation.

The network device sends the first transmit power control command to the terminal device.

Specifically, when the first transmission manner at least includes the first transmit power, the operation that the terminal device determines the first transmission manner includes that the terminal device determines the first transmit power. The operation that the terminal device determines the first transmit power may be implemented through receiving first power regulation information sent by the network device.

As an alternative embodiment, the operation that the terminal device determines the first transmission manner adopted for transmission of the target uplink information in the first time unit includes the following action.

The terminal device determines a first resource index adopted for transmission of the target uplink information in the first time unit according to first information. The first information is different from second information and the second information is configured for the terminal device to determine a second resource index adopted for transmission of the target uplink information in the second time unit.

Specifically, when the first transmission manner at least includes the first resource index, the operation that the terminal device determines the first transmission manner includes that the terminal device determines the first resource index. It is to be understood that the first resource index corresponding to the first time unit is different from the second resource index corresponding to the second time unit. Therefore, the terminal device may determine the first resource index according to the first information different from the second information, and the second information is configured to indicate the second resource index adopted by the terminal device for transmission of the target uplink information in the second time unit.

It is to be understood that the first information may directly be a specific resource index and may also be another parameter related to the resource index, for example, a physical resource index occupied by downlink control signaling, or a physical resource index occupied by a downlink data channel or other high-layer signaling. There are no limits made thereto in the embodiments of the disclosure.

As an alternative embodiment, before the operation that the network device receives the target uplink information sent by the terminal device through the first transmission manner in the first transmission unit, the method further includes the following operation.

The network device sends the first information to the terminal device.

As an alternative embodiment, the operation that the terminal device determines the first transmission manner adopted for transmission of the target uplink information in the first time unit includes the following action.

The terminal device determines the first resource index adopted for transmission of the target uplink information in the first time unit according to third information and a first algorithm. The first algorithm is different from a second algorithm and the second algorithm is configured for the terminal device to determine the second resource index adopted for transmission of the target uplink information in the second time unit according to the third information.

Specifically, when the third information is configured to indicate the first resource index adopted by the terminal device for transmission of the target uplink information in the first time unit and indicate the second resource index adopted by the terminal device for transmission of the target uplink information in the second time unit, the terminal device may determine the first resource index by combining the third information and the first algorithm. Herein, the first algorithm may be any other algorithm different from the second algorithm and the second algorithm is configured for the terminal device to combine the third information and the second algorithm to determine the second resource index. Therefore, in the embodiments of the disclosure, the first resource index determined by the terminal device is also different from the second resource index for transmission of the target uplink information in the second time unit.

It is to be understood that the third information may be configuration signaling transmitted to the terminal device by the network device, for example, downlink control signaling and high-layer signaling. There are no limits made thereto in the embodiments of the disclosure. The first algorithm may be a predetermined algorithm and may also be an algorithm configured for the terminal device by the network device. There are also no limits made thereto in the embodiments of the disclosure.

As an alternative embodiment, before the operation that the network device receives the target uplink information sent by the terminal device through the first transmission manner in the first transmission unit, the method further includes the following operation.

The network device sends the third information and the first algorithm to the terminal device.

As an alternative embodiment, responsive to determining that the type of the target uplink information is the periodic CSI, the first preprocessing manner is to select information with a highest priority in the periodic CSI for transmission.

Responsive to determining that the type of the target uplink information is the ACK/NACK information, the first preprocessing manner is to perform bundling across the ACK/NACK information.

The method for transmitting information according to the embodiments of the disclosure is described above in combination with FIG. 1 and FIG. 2 in detail. The device for transmitting information according to the embodiments of the disclosure will be described below in combination with FIG. 3 to FIG. 6 in detail.

Figure 3:
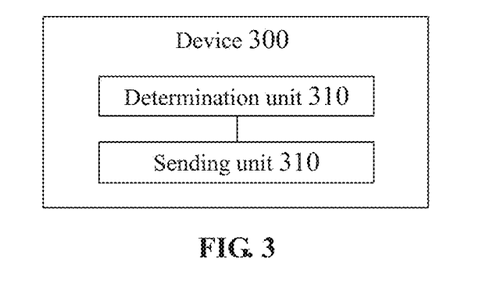
FIG. 3 is a schematic block diagram of a device for transmitting information according to an embodiment of the disclosure.

FIG. 3 is a schematic diagram of a device 300 for transmitting information according to an embodiment of the disclosure. For example, the device may be a terminal device in the method 300. The device 300 includes a determination unit 310 and a sending unit 320.

The determination unit 310 is configured to determine a first transmission manner adopted for transmission of target uplink information in a first time unit. The first transmission manner is different from a second transmission manner adopted by the device for transmission of the target uplink information in a second time unit and a time length for transmission of the target uplink information in the second time unit is different from a time length for transmission of the target uplink information in the first time unit.

The sending unit 320 is configured to send the target uplink information to a network device in the first transmission manner.

According to the device for transmitting information of the embodiment of the disclosure, the terminal device determines the first transmission manner adopted for transmission of the target uplink information in the first time unit and adopts the first transmission manner to send the target uplink information to the network device. The first transmission manner is different from the second transmission manner adopted by the terminal device for transmission of the target uplink information in the second time unit different from the first time unit. In such a manner, the terminal device may adopt different transmission manners to send the target uplink information through different time units and the flexibility of time resource allocation in a system may be improved, thereby improving system performance.

As an alternative embodiment, the type of the target uplink information includes at least one of ACK/NACK information or periodic CSI.

As an alternative embodiment, at least one of the following manners the first transmission manner includes is different from at least one of the following manners the second transmission manner includes: a preprocessing manner adopted by the device 300 for the target uplink information; a transmission mode adopted by the device 300 for transmission of the target uplink information; a number of frequency-domain resources adopted by the device 300) for transmission of the target uplink information; transmit power adopted by the terminal device for transmission of the target uplink information; or a resource index of a resource adopted by the device 300 for transmission of the target uplink information.

As an alternative embodiment, the determination unit 310 may specifically be configured to determine a first transmission mode adopted for transmission of the target uplink information in the first time unit. The first transmission mode may be a predetermined transmission mode.

As an alternative embodiment, the device 3X) may further include a first receiving unit. The first receiving unit may be configured to, before the first transmission manner adopted for transmission of the target uplink information in the first time unit is determined, receive the first transmission mode adopted for transmission of the target uplink information in the first time unit from the network device.

As an alternative embodiment, the determination unit 310 may specifically be configured to determine the number of first frequency-domain resources adopted for transmission of the target uplink information in the first time unit according to at least one of the following information: the number of second frequency-domain resources, the number of uplink time resources in the first time unit or the number of uplink time resources in the second time unit, the number of the second frequency-domain resources being the number of frequency-domain resources adopted by the device 300 for transmission of the target uplink information in the second time unit; or determine the number of the first frequency-domain resources according to a predetermined parameter or a predetermined rule.

As an alternative embodiment, the device 300 may further include a second receiving unit. The second receiving unit may be configured to, before the first transmission manner adopted for transmission of the target uplink information in the first time unit is determined, receive the number of first frequency-domain resources adopted for transmission of the target uplink information in the first time unit from the network device.

As an alternative embodiment, the number of first frequency-domain resources may be $\lceil A \cdot B \rceil$. A and B is positive numbers, A is the number of the second frequency-domain resources or a predetermined parameter and B is a predetermined parameter, a parameter determined according to the predetermined rule or a parameter received by the device 300 from the network device.

As an alternative embodiment. $B = k \cdot \lceil M/x \rceil$. M is the number of the uplink time resources in the second time unit, k is a positive integer and k is a predetermined parameter or a parameter received by the device 300 from the network device. As an alternative embodiment, $B = \lceil t \cdot M/x \rceil$. M is the number of the uplink time resources in the second time unit, t is a positive number and t is a predetermined parameter or a parameter received by the device 300 from the network device. As an alternative embodiment, $B = q \cdot x$. q is a positive number and q is a predetermined parameter or a parameter received by the device 300 from the network device.

As an alternative embodiment, the device may 300 further include a third receiving unit. The third receiving unit may be configured to, before the first transmission manner adopted for transmission of the target uplink information in the first time unit is determined, receive a first transmit power control command sent by the network device. The first transmit power control command may be configured to adjust transmit power for transmission of the target uplink information in the first time unit or the first transmit power control command may be configured to adjust the transmit power for transmission of the target uplink information in the first time unit and transmit power for transmission of the target uplink information in the second time unit. The determination unit 310 may specifically be configured to determine a first transmit power adopted for transmission of the target uplink information in the first time unit according to the first transmit power control command.

As an alternative embodiment, the determination unit 310 may specifically be configured to determine a first resource index adopted for transmission of the target uplink information in the first time unit according to first information. The first information may be different from second information and the second information may be configured for the device 300 to determine a second resource index adopted for transmission of the target uplink information in the second time unit.

As an alternative embodiment, the determination unit 310 may specifically be configured to determine a first resource index adopted for transmission of the target uplink information in the first time unit according to third information and a first algorithm. The first algorithm may be different from a second algorithm and the second algorithm may be configured for the device 300 to determine the second resource index adopted for transmission of the target uplink information in the second time unit according to the third information.

As an alternative embodiment, responsive to determining that the type of the target uplink information is the periodic CSI, the first preprocessing manner is to select information with a highest priority in the periodic CSI for transmission; or responsive to determining that the type of the target uplink information is the ACK/NACK information, the first preprocessing manner is to perform bundling across the ACK/NACK information.

As an alternative embodiment, the device 300 may further include a fourth receiving unit. The fourth receiving unit may be configured to, before the first transmission manner adopted for transmission of the target uplink information in the first time unit is determined, receive a first notification message sent by the network device. The first notification message may be configured to notify the device that the target uplink information can be transmitted in the first time unit and the second time unit.

It is to be understood that the device 300 described herein is embodied in form of functional modules. Term "unit" mentioned herein may refer to an Application Specific Integrated Circuit (ASIC), an electronic circuit, a processor (for example, a shared processor, a dedicated processor or a group processor) configured to execute one or more software or firmware programs and a memory, a merged logic circuit and/or another proper component supporting the described functions. In an alternative example, it may be understood by those skilled in the art that the device 300 may specifically be the terminal device in the abovementioned embodiments and the device 300 may be configured to execute each flow and/or operation corresponding to the terminal device in the abovementioned method embodiments, which will not be elaborated herein for avoiding repetitions.

Figure 4:
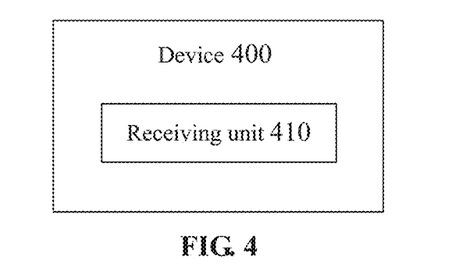
FIG. 4 is a schematic block diagram of another device for transmitting information according to an embodiment of the disclosure.

FIG. 4 is a schematic diagram of a device 400 for transmitting information according to an embodiment of the disclosure. For example, the device may be a terminal device in the method 40). The device 400 includes a receiving unit 410.

The receiving unit 410 is configured to receive target uplink information sent by a terminal device through a first transmission manner in a first transmission unit. The first transmission manner is different from a second transmission manner adopted by the terminal device for transmission of the target uplink information in a second time unit and a time length for transmission of the target uplink information in the second time unit is different from a time length for transmission of the target uplink information in the first time unit.

According to the device for transmitting information of the embodiment of the disclosure, the network device receives the target uplink information sent by the terminal device in the first transmission manner. The first transmission manner is different from the second transmission manner adopted by the terminal device for transmission of the target uplink information in the second time unit different from the first time unit. In such a manner, the network device may receive the target uplink information sent by the terminal device in different transmission manners through different time units and the flexibility of time resource allocation in a system may be improved, thereby improving system performance.

As an alternative embodiment, the type of the target uplink information includes at least one of ACK-NACK information or periodic CSI.

As an alternative embodiment, at least one of the following manners the first transmission manner includes is different from at least one of the following manners the second transmission manner includes: a preprocessing manner adopted by the terminal device for the target uplink information; a transmission mode adopted by the terminal device for transmission of the target uplink information, the transmission mode being an MIMO mode; the number of frequency-domain resources adopted by the terminal device for transmission of the target uplink information; transmit power adopted by the terminal device for transmission of the target uplink information; or a resource index of a resource adopted by the terminal device for transmission of the target uplink information.

As an alternative embodiment, the device may further include a first sending unit. The first sending unit may be configured to send a first transmission mode adopted for transmission of the target uplink information in the first time unit to the terminal device.

As an alternative embodiment, the device may further include a second sending unit. The second sending unit may be configured to send the number of first frequency-domain resources adopted for transmission of the target uplink information in the first time unit to the terminal device.

As an alternative embodiment, the number of the first frequency-domain resources may be $\lceil A \cdot B \rceil$. A and B is positive numbers, A is the number of the second frequency-domain resources or a predetermined parameter and B is a predetermined parameter, a parameter determined according to the predetermined rule or a parameter received by the terminal device from the device 400.

As an alternative embodiment, $B = k \cdot \lceil M/x \rceil$. M is the number of the uplink time resources in the second time unit, k is a positive integer and k is a predetermined parameter or a parameter received by the terminal device from the device 400. As an alternative embodiment, $B = \lceil t \cdot M/x \rceil$. M is the number of the uplink time resources in the second time unit, t is a positive number and t is a predetermined parameter or a parameter received by the terminal device from the device 400. As an alternative embodiment, $B = q \ x$. q is a positive number and q is a predetermined parameter or a parameter received by the terminal device from the device 400.

As an alternative embodiment, the device may further include a third sending unit. The third sending unit may be configured to send a first transmit power control command to the terminal device. The first transmit power control command may be configured to adjust transmit power for transmission of the target uplink information in the first time unit or the first transmit power control command may be configured to adjust the transmit power for transmission of the target uplink information in the first time unit and transmit power for transmission of the target uplink information in the second time unit.

As an alternative embodiment, the device may further include a fourth sending unit. The fourth sending unit may be configured to send first information to the terminal device. The first information may be configured for the terminal device to determine a first resource index adopted for transmission of the target uplink information in the first time unit, the first information may be different from second information and the second information may be configured for the terminal device to determine a second resource index adopted for transmission of the target uplink information in the second time unit.

As an alternative embodiment, the device may further include a fifth sending unit. The fifth sending unit may be configured to send third information and a first algorithm to the terminal device. The third information and the first algorithm may be configured for the terminal device to determine the first resource index adopted for transmission of the target uplink information in the first time unit. The first algorithm may be different from a second algorithm and the second algorithm may be configured for the terminal device to determine the second resource index adopted for transmission of the target uplink information in the second time unit according to the third information.

As an alternative embodiment, responsive to determining that the type of the target uplink information is the periodic CSI, the first preprocessing manner is to select information with a highest priority in the periodic CSI for transmission; or responsive to determining that the type of the target uplink information is the ACK/NACK information, the first preprocessing manner is to perform bundling across the ACK/NACK information.

As an alternative embodiment, the device may further include a sixth sending unit. The sixth sending unit may be configured to, before the target uplink information sent by the terminal device through the first transmission manner in the first transmission unit is received, send a first notification message to the terminal device. The first notification message may be configured to notify the terminal device that the target uplink information can be transmitted in the first time unit and the second time unit.

It is to be understood that the device 400 described herein is embodied in form of functional modules. Term "unit" mentioned herein may refer to an ASIC, an electronic circuit, a processor (for example, a shared processor, a dedicated processor or a group processor) configured to execute one or more software or firmware programs and a memory, a merged logic circuit and/or another proper component supporting the described functions. In an alternative example, it may be understood by those skilled in the art that the device 400 may specifically be the network device in the abovementioned embodiments and the device 400 may be configured to execute each flow and/or operation corresponding to the network device in the abovementioned method embodiments, which will not be elaborated herein for avoiding repetitions.

Figure 5:
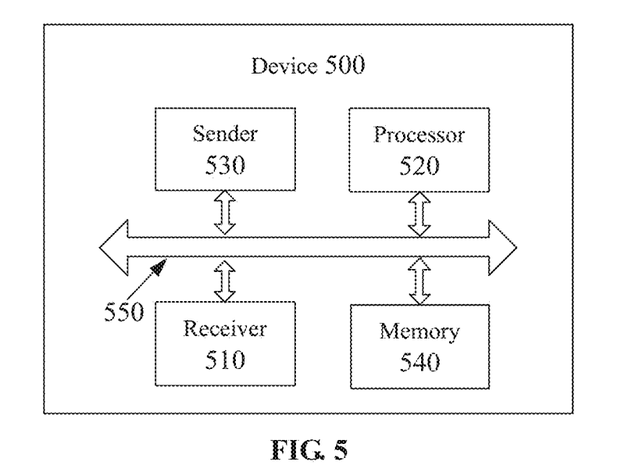
FIG. 5 is a schematic block diagram of another device for transmitting information according to an embodiment of the disclosure.

FIG. 5 illustrates a device 500 for transmitting information according to an embodiment of the disclosure. The device 500 includes a receiver 510, a processor 520, a sender 530, a memory 540 and a bus system 550. The receiver 510, the processor 520, the sender 530 and the memory 540 are connected through the bus system 550. The memory 540 is configured to store an instruction. The processor 520 is configured to execute the instruction stored in the memory 540 to control the receiver 510 to receive a signal and control the sender 530 to send an instruction.

The processor 520 is configured to determine a first transmission manner adopted for transmission of target uplink information in a first time unit. The first transmission manner is different from a second transmission manner adopted by the device for transmission of the target uplink information in a second time unit and a time length for transmission of the target uplink information in the second time unit is different from a time length for transmission of the target uplink information in the first time unit.

The sender 530 is configured to send the target uplink information to a network device in the first transmission manner.

It is to be understood that the device 500 may specifically be the terminal device in the abovementioned embodiments and may be configured to execute each operation and/or flow corresponding to the terminal device in the abovementioned method embodiments. In at least one embodiment, the memory 540 may include a Read-Only Memory (ROM) and a Random Access Memory (RAM) and provides an instruction and data for the processor. A part of the memory may further include a nonvolatile RAM. For example, the memory may further store information of a device type. The processor 520 may be configured to execute the instruction stored in the memory, and when the processor executes the instruction, the processor may execute each operation corresponding to the terminal device in the abovementioned method embodiments.

Figure 6:
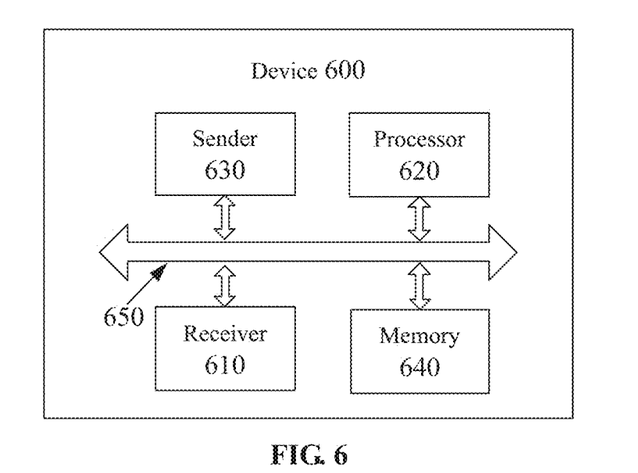
FIG. 6 is a schematic block diagram of another device for transmitting information according to an embodiment of the disclosure.

FIG. 6 illustrates a device 600 for transmitting information according to an embodiment of the disclosure. The device 600 includes a receiver 610, a processor 620, a sender 630, a memory 640 and a bus system 660. The receiver 610, the processor 620, the sender 630 and the memory 640 are connected through the bus system 660. The memory 640 is configured to store an instruction. The processor 620 is configured to execute the instruction stored in the memory 640 to control the receiver 610 to receive a signal and control the sender 630 to send an instruction.

The receiver 610 is configured to receive target uplink information sent by a terminal device through a first transmission manner in a first transmission unit. The first transmission manner is different from a second transmission manner adopted by the terminal device for transmission of the target uplink information in a second time unit and a time length for transmission of the target uplink information in the second time unit is different from a time length for transmission of the target uplink information in the first time unit.

It is to be understood that the device 600 may specifically be the network device in the abovementioned embodiments and may be configured to execute each operation and/or flow corresponding to the network device in the abovementioned method embodiments. In at least one embodiment, the memory 640 may include a ROM and a RAM and provides an instruction and data for the processor. A part of the memory may further include a nonvolatile RAM. For example, the memory may further store information of a device type. The processor 620 may be configured to execute the instruction stored in the memory, and when the processor executes the instruction, the processor may execute each operation corresponding to the network device in the abovementioned method embodiments.

It is to be understood that, in the embodiments of the disclosure, the processor may be a Central Processing Unit (CPU) and the processor may also be another universal processor, a Digital Signal Processor (DSP), an ASIC, a Field-Programmable Gate Array (FPGA) or other programmable logic device, discrete gate or transistor logic device, discrete hardware component and the like. The universal processor may be a microprocessor or the processor may also be any conventional processor and the like.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting information, comprising:
determining, by a terminal device, a first transmission manner adopted for transmission of target uplink information in a first time unit, the first transmission manner being different from a second transmission manner adopted by the terminal device for transmission of the target uplink information in a second time unit, each of the first transmission manner and the second transmission manner comprising a preprocessing manner adopted by the terminal device for the target uplink information and a number of frequency-domain resources adopted by the terminal device for transmission of the target uplink information, a first preprocessing manner for the first transmission manner being different from a second preprocessing manner for the second transmission manner and a number of first frequency-domain resources for the first transmission manner being different from a number of second frequency-domain resources for the second transmission manner, a time length for transmission of the target uplink information in the second time unit being different from a time length for transmission of the target uplink information in the first time unit, and a bandwidth for transmission of the target uplink information in the second time unit being different from a bandwidth transmission of the target uplink information in the first time unit, wherein the first time unit is a first time slot, and the second time unit is a second time slot; and sending, by the terminal device, the target uplink information to a network device in the first transmission manner, wherein responsive to determining that a type of the target uplink information is periodic Channel State Information (CSI), the first preprocessing manner is to select information with a highest priority in the periodic CSI for transmission, wherein determining, by the terminal device, the first transmission manner adopted for transmission of the target uplink information in the first time unit comprises:

determining, by the terminal device, the number of the first frequency-domain resources adopted for transmission of the target uplink information in the first time unit according to a number of uplink time resources in the first time unit and a size of the target uplink information.

2. The method of claim 1, wherein the type of the target uplink information further comprises Acknowledgement/Non-Acknowledgement (ACK/NACK) information.

3. The method of claim 1, wherein each of the first transmission manner and the second transmission manner further comprises at least one of the following manners, and at least one of the following manners for the first transmission manner is different from that for the second transmission manner:

a transmission mode adopted by the terminal device for transmission of the target uplink information, the transmission mode being a Multiple Input Multiple Output (MIMO) mode;

transmit power adopted by the terminal device for transmission of the target uplink information; or a resource index of a resource adopted by the terminal device for transmission of the target uplink information.

4. The method of claim 1, wherein determining, by the terminal device, the first transmission manner adopted for transmission of the target uplink information in the first time unit further comprises:

determining, by the terminal device, a first transmission mode adopted for transmission of the target uplink information in the first time unit, the first transmission mode being a predetermined transmission mode.

5. The method of claim 1, wherein before determining, by the terminal device, the first transmission manner adopted for transmission of the target uplink information in the first time unit, the method further comprises:

receiving, by the terminal device, a first transmission mode adopted for transmission of the target uplink information in the first time unit from the network device.

6. The method of claim 3, wherein before determining, by the terminal device, the first transmission manner adopted for transmission of the target uplink information in the first time unit, the method further comprises:

receiving, by the terminal device, a number of first frequency-domain resources adopted for transmission of the target uplink information in the first time unit from the network device.

7. The method of claim 3, wherein before determining, by the terminal device, the first transmission manner adopted for transmission of the target uplink information in the first time unit, the method further comprises:

receiving, by the terminal device, a first transmit power control command sent by the network device, the first transmit power control command being configured to adjust transmit power for transmission of the target uplink information in the first time unit or the first transmit power control command being configured to adjust the transmit power for transmission of the target uplink information in the first time unit and transmit power for transmission of the target uplink information in the second time unit;

wherein determining, by the terminal device, the first transmission manner adopted for transmission of the target uplink information in the first time unit further comprises:

determining, by the terminal device, a first transmit power adopted for transmission of the target uplink information in the first time unit according to the first transmit power control command.

8. The method of claim 3, wherein determining, by the terminal device, the first transmission manner adopted for transmission of the target uplink information in the first time unit further comprises:

determining, by the terminal device, a first resource index adopted for transmission of the target uplink information in the first time unit according to first information, the first information being different from second information and the second information being configured for the terminal device to determine a second resource index adopted for transmission of the target uplink information in the second time unit.

9. The method of claim 3, wherein determining, by the terminal device, the first transmission manner adopted for transmission of the target uplink information in the first time unit further comprises:

determining, by the terminal device, a first resource index adopted for transmission of the target uplink information in the first time unit according to third information and a first algorithm, the first algorithm being different from a second algorithm and the second algorithm being configured for the terminal device to determine a second resource index adopted for transmission of the target uplink information in the second time unit according to the third information.

10. The method of claim 3, wherein
responsive to determining that the type of the target uplink information is the ACK/NACK information, the first preprocessing manner is to perform bundling across the ACK/NACK information.

11. A device for transmitting information, comprising:
a processor, configured to determine a first transmission manner adopted for transmission of target uplink information in a first time unit, the first transmission manner being different from a second transmission manner adopted by the device for transmission of the target uplink information in a second time unit, each of the first transmission manner and the second transmission manner comprising a preprocessing manner adopted by the terminal device for the target uplink information and a number of frequency-domain resources adopted by the terminal device for transmission of the target uplink information, a first preprocessing manner for the first transmission manner being different from a second preprocessing manner for the second transmission manner and a number of first frequency-domain resources for the first transmission manner being different from a number of second frequency-domain resources for the second transmission manner, and a time length for transmission of the target uplink information in the second time unit being different from a time length for transmission of the target uplink information in the first time unit, and a bandwidth for transmission of the target uplink information in the second time unit being different from a bandwidth transmission of the target uplink information in the first time unit, wherein the first time unit is a first time slot, and the second time unit is a second time slot; and a sender, configured to send the target uplink information to a network device in the first transmission manner, wherein responsive to determining that a type of the target uplink information is periodic Channel State Information (CSI), the first preprocessing manner is to select information with a highest priority in the periodic CSI for transmission, wherein the processor is specifically configured to:

determine the number of the first frequency-domain resources adopted for transmission of the target uplink information in the first time unit according a number of uplink time resources in the first time unit and a size of the target uplink information.

12. The device of claim 11, wherein the type of the target uplink information further comprises Acknowledgement/Non-Acknowledgement (ACK/NACK) information.

13. The device of claim 11, wherein each of the first transmission manner and the second transmission manner further comprises at least one of the following manners, and at least one of the following manners for the first transmission manner is different from that for the second transmission manner:

a transmission mode adopted by the terminal device for transmission of the target uplink information, the transmission mode being a Multiple Input Multiple Output (MIMO) mode;

transmit power adopted by the terminal device for transmission of the target uplink information; or a resource index of a resource adopted by the terminal device for transmission of the target uplink information.

14. The device of claim 13, wherein the processor is specifically configured to:

determine a first transmission mode adopted for transmission of the target uplink information in the first time unit, the first transmission mode being a predetermined transmission mode.

15. The device of claim 13, further comprising:

a first receiver, configured to, before the first transmission manner adopted for transmission of the target uplink information in the first time unit is determined, receive a first transmission mode adopted for transmission of the target uplink information in the first time unit from the network device.

16. The device of claim 13, further comprising:

a second receiver, configured to, before the first transmission manner adopted for transmission of the target uplink information in the first time unit is determined, receive a number of first frequency-domain resources adopted for transmission of the target uplink information in the first time unit from the network device.

17. The device of claim 13, further comprising:

a third receiver, configured to, before the first transmission manner adopted for transmission of the target uplink information in the first time unit is determined, receive a first transmit power control command sent by the network device, the first transmit power control command being configured to adjust transmit power for transmission of the target uplink information in the first time unit or the first transmit power control command being configured to adjust the transmit power for transmission of the target uplink information in the first time unit and transmit power for transmission of the target uplink information in the second time unit;

wherein the processor is specifically configured to:

determine a first transmit power adopted for transmission of the target uplink information in the first time unit according to the first transmit power control command.

18. The device of claim 13, wherein the processor is specifically configured to:

determine a first resource index adopted for transmission of the target uplink information in the first time unit according to first information, the first information being different from second information and the second information being configured for the device to determine a second resource index adopted for transmission of the target uplink information in the second time unit.

19. The device of claim 13, wherein the processor is specifically configured to:

determine a first resource index adopted for transmission of the target uplink information in the first time unit according to third information and a first algorithm, the first algorithm being different from a second algorithm and the second algorithm being configured for the device to determine a second resource index adopted for transmission of the target uplink information in the second time unit according to the third information.

20. The device of claim 13, wherein responsive to determining that the type of the target uplink information is the ACK/NACK information, the first preprocessing manner is to perform bundling across the ACK/NACK information.

21. A non-transitory computer-readable storage medium, comprising an instruction that, when executed by a processor, causes the processor to execute a method for transmitting information, the method comprising:

determining a first transmission manner adopted for transmission of target uplink information in a first time unit, the first transmission manner being different from a second transmission manner adopted by the terminal device for transmission of the target uplink information in a second time unit, each of the first transmission manner and the second transmission manner comprising a preprocessing manner adopted by the terminal device for the target uplink information and a number of frequency-domain resources adopted by the terminal device for transmission of the target uplink information, a first preprocessing manner for the first transmission manner being different from a second preprocessing manner for the second transmission manner and a number of first frequency-domain resources for the first transmission manner being different from a number of second frequency-domain resources for the second transmission manner, and a time length for transmission of the target uplink information in the second time unit being different from a time length for transmission of the target uplink information in the first time unit, and a bandwidth for transmission of the target uplink information in the second time unit being different from a bandwidth transmission of the target uplink information in the first time unit, wherein the first time unit is a first time slot, and the second time unit is a second time slot; and sending the target uplink information to a network device in the first transmission manner, wherein responsive to determining that a type of the target uplink information is periodic Channel State Information (CSI), the first preprocessing manner is to select information with a highest priority in the periodic CSI for transmission, wherein determining, by the terminal device, the first transmission manner adopted for transmission of the target uplink information in the first time unit comprises:

determining, by the terminal device, the number of the first frequency-domain resources adopted for transmission of the target uplink information in the first time unit according to a number of uplink time resources in the first time unit and a size of the target uplink information.

* * * * *